United States Patent Office 3,498,845
Patented Mar. 3, 1970

3,498,845
GALVANIC BATTERY
Esko Ensio Huhta-Koivisto, Helsinki, Finland, assignor to Ministry of Defence, Helsinki, Finland
Filed Sept. 11, 1967, Ser. No. 666,794
Claims priority, application Finland, Sept. 12, 1966, 2,374/66
Int. Cl. H01m 11/00
U.S. Cl. 136—162                    2 Claims

ABSTRACT OF THE DISCLOSURE

The present invention relates to galvanic batteries of the kind where various electrolyte components are mixed to form an electrolyte which is then passed just once through the cells of the battery and thereafter discarded.

BACKGROUND OF THE INVENTION

In many vehicles, such as aircraft, missiles, torpedoes, in many reserve generators and generally in starting, a battery is needed which for a short time can generate energy at full capacity and which at the same time is light and keeps well stored. Because of its great weight, the common lead accumulator is not well suited for these purposes, and so new types of batteries have been developed, among which there may be mentioned the silver accumulator whose disadvantages are a short lifetime and high price as well as the combustion element batteries, which again are best suited for a long-time operation as quite great units.

For these purposes different primary batteries have also been used, which are activated at the moment of use by filling the cells with electrolyte. Until then the battery is dry and so keeps well in storage. The seawater battery used in electric torpedoes is a typical example of these batteries in which magnesium and silver chloride are the electrodes and the sea water serves directly as the electrolyte. Because of the silver used in the electrodes, the battery is very expensive. That is why it has been attempted to use also other less expensive batteries of this type, in which zinc or a corresponding metal forms the negative electrode and carbon the positive one, when the electorlytic liquid contains a depolarisator. The need of the great mass of the electrolytes in these batteries has, however, been an insurmountable obstacle in the conveyable applications and another serious disadvantage is the fact, that as the electrolyte is losing power, the voltage of the battery is decreasing.

It is known that the efficiency of a galvanic battery is considerably increased when the electrolyte is brought into movement with respect to the electrodes and, because of this, batteries in which the electrolyte circulates through the elements have been developed. An attempt has been made to compensate the consumption of the active elements of the electrolyte during the reaction by adding fresh electrolyte to the circulation. As, however, the reaction products accumulate in the electrolyte, it has not been possible to make full use of the electrolyte at the same time keeping constant the battery voltage but it has been proved in practice that once the electrolyte has been consumed to about 40%, the battery voltage begins considerably to decrease.

SUMMARY OF THE INVENTION

The object of the invention is to provide a galvanic battery which is considerably cheaper than prior known batteries of corresponding capacity and which comprises a plurality of cells, and means for supplying water and at least one other electrolyte component from separate sources to form an electrolyte and for feeding said electrolyte through the cells of the battery under conditions favourable for the generation of energy at optimal and substantially constant capacity during the whole operation of the battery. This is achieved according to the invention by providing first regulating means responsive to the voltage of the battery for regulating the supply of said electrolyte components and thus the concentration of the electrolyte formed in a direction counteracting voltage variations, means for preheating water to be supplied to the electrolyte, a first duct connecting the source of water directly to the water supply means, a second duct connecting said source of water via said preheating means to said water supply means, means responsive to the temperature of said formed electrolyte, and second regulating means in said ducts controlled by said temperatures responsive means for regulating the proportion of water supplied through said ducts respectively in a direction counteracting variations from a preselected temperature value.

It is a further object of the invention to provide a galvanic battery having third regulating means controlling said water supply means for keeping the supply of water substantially constant during the whole operation of the battery, said first regulating means controlling the supply of said other electrolyte components in a direction counteracting voltage variations.

With specific reference to a battery using an electrolyte formed of water, sulphuric acid and chromic acid, the object of the invention is to provide first regulating means controlling the means for supplying sulphuric acid and chromic acid to keep the proportion of sulphuric acid and chromic acid constant irrespective of the variations of the total amount of said components.

Further objects and advantages of the invention will become evident of the following description of a preferred embodiment of the invention.

DESCRIPTION OF THE PREFERRED EMBODIMENT

Figure 1:
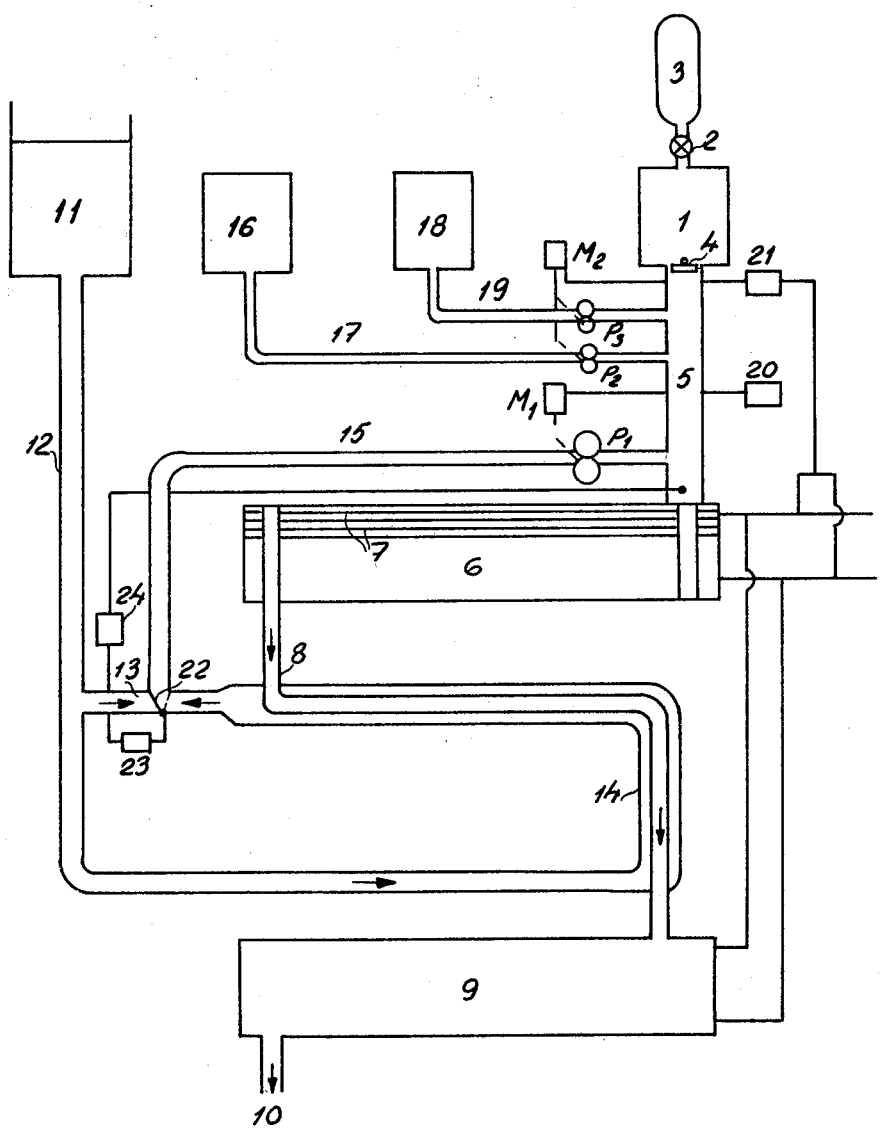
FIGURE 1 represents a schematic view of the entire battery with its regulating means.

With reference of FIGURE 1, reference numeral 1 designates a tank for ready-mixed electrolyte; the tank is connected by valve 4 and inlet pipe 5 to a group 6 of cells. This group is equipped with bipolar electrode plates 7 of zinc and carbon. The group 6 of cells is connected by pipe 8 to another similar group 9 of cells which is equipped with an outlet pipe 10 for the electrolyte.

A pressure vessel 3 is connected to the tank 1 by a valve 2; it is intended to drive the electrolyte from the tank 1 to the battery in order to initiate the operation of the battery.

Supply lines leading from separate sources of electrolyte components required to form the electrolyte are connected to the inlet 5. Thus a water source 11 is connected by a pipe line system 12, 13, 14, 15 to the inlet pipe 5. Further, a chromic acid tank 16 is connected through a pipe 17 to inlet pipe 5 and a sulphuric acid tank 18 is connected through a pipe 19 to the inlet pipe 5. In the pipe 15 there is a feed-pump $P_1$ operated by motor $M_1$, in the pipe 17 a feed-pump $P_2$ operated by motor $M_2$ and in the pipe 19 a feed-pump $P_3$ also operated by motor $M_2$.

When the battery is in operation, water, chromic acid and sulphuric acid are supplied by feed-pumps $P_1$, $P_2$, and $P_3$, respectively to the inlet pipe 5, where they get mixed so as to form the electrolyte which then flows through the cells of the battery and, being consumed, is finally discharged through the outlet pipe 10.

To stabilize the operation of the battery it is equipped, according to the invention, with different control means.

As for the operation of the battery, the strength and the temperature of the electrolyte are the most important factors to be considered. The variations of the strength of the electrolyte immediately influence the voltage. That is why the feed-pumps of the electrolyte components are in the invention equipped with control means which regulate the operation of the pumps so that the strength of the electrolyte will be modified in a direction any variation of the voltage. Thus the motor $M_1$ of the water-pump $P_1$ is equipped with a control means 20 responsive to the voltage of the battery and the motor $M_2$ of the acid pumps $P_2$ and $P_3$ is also equipped with control means 21 responsive to the battery voltage. Control means 20 for the water-pump is a conventional constant voltage regulator the control range of which is wide enough so that even at a low battery voltage the water-pump is operating at full capacity, the amount of water supplied thus being constant throughout the time of operation. So the control of the electrolyte strength is carried out in the embodiment described by controlling the supply of the acids. A favourable proportion between the electrolyte components is in normal operation about 74% of water, about 15% of sulphuric acid and about 11% of chromic acid, given as parts by weight of the total electrolyte. Because the portion of water is biggest particularly when counted in parts by volume, the above control system is advantageous in that the total volume of the supplied electrolyte does not vary very much, and all the time there is a sufficient amount of flowing liquid available to transfer the heat generated in the battery, which facts are very important for the undisturbed operation of the battery.

Figure 2:
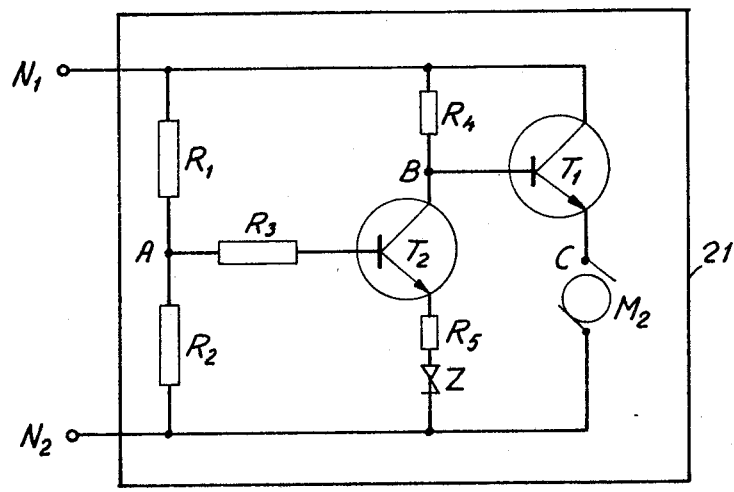
FIGURE 2 shows a wiring diagram of a regulating means forming a part of the battery.

In FIGURE 2 an example is shown of a wiring diagram of the control means 21 for regulating the supply of the acids. The battery voltage is brought to the poles $N_1$, and $N_2$ of the control means 21. Transistors $T_1$, and $T_2$, a Zener diode Z and resistances $R_{1-5}$ form the control means. The wiring is such that at a low battery voltage the transistor $T_2$ is fulley conductive and the motor $M_2$ receives full voltage and so feeds a maximum amount of acids into the electrolyte. As the battery voltage consequently increases, the voltage also at point A goes up, and when this voltage has passed the Zener voltage of the Zener diode, the transistor $T_1$ begins to pass current. Now the voltage at point B and at the same time at the pole C of the motor decreases, and as a consequence the motor slows down and the supplied amounts of acid decrease. As the acid pumps $P_2$ and $P_3$ are operated by the same motor, the quantities of acids always vary in the same proportion, so that the proportion between chromic acid and sulphuric acid remains unchanged regardless of the variations of the total amount supplied. By changing the values of the resistance $R_{1-5}$, the operating point and the control range of the control means can be changed to suit the conditions desired.

As mentioned already another important factor concerning the operation of the battery is the temperature of the electrolyte. It is known that the efficacy of the chromic acid battery increases with increasing temperature. So the internal resistance of the battery first decreases radically until after 45° C. the influence of the inwarming decreases and at 50–100° C. the influence increasing the efficacy is only very feeble. On the other hand, the reaction will accelerate after 80° C. so that a considerable amount of excess heat will be generated which only has an unfavourable influence because the battery may begin to boil. Thus it should be attempted to keep the temperature in the favourable range of operation of 45–90° C.

As it is known, heat is generated on mixing sulphuric acid and water, so that it is easy to achieve the most advantageous temperature right at the inlet end of the battery. On the other hand, as it is known, the electrolyte is heated in passing through the battery because of the internal resistance of the battery and of the exothermal reaction, so that a proper temperature at the inlet end may cause boiling at the latter part. That is why the cells of the battery have been divided into groups 6 and 9 and between them an intermediate cooling of the electrolyte will be carried out. This has been effected in the embodiment shown by forming the portion 14 of the water supply line 12 and the pipe 8 for the electrolyte between the sections 6 and 9 to act as a countercurrent heat exchanger. In this heat exchanger the electrolyte serves as the heat delivering medium and the water to be fed into the electrolyte as the heat receiving medium. This way of prewarming the water to be fed into the electrolyte is used, according to the invention, to control the temperature of the electrolyte.

For this purpose, a flap valve 22 has been fitted in the embodiment shown to the T-branch formed by water supply pipes 13, 14, and 15. This flap valve is operated by an electric magnet 23 equipped with a counterspring so that it turns between two positions: in its normal position it completely closes the connection 13 between pipes 14 and pipe 15; in the other position pipe 13 is connected to pipe 15 and pipe 14 is closed. The electric magnet 23 in turn is conducted by a control means 24 which is of any suitable conventional tye sensitive to temperature. The feeler organ of this control means is fitted, for instance, into the inlet pipe 5 between the supply pipes of the electrolyte components and the inlet of the sections 6 of the battery. So the control means 24 is selected to suit a certain temperature or range of temperature and operating so that when the temperature of the electrolyte increases so as to pass a predetermined operating point, the output voltage of the control means 24 increases to such a value that magnet 23 is activated, in which case valve 22 will close the flow of water preheated in the heat exchanger 8, and open the connection the flow of cold water from pipe 13 to the supply pipe 15. When the temperature of the electrolyte decreases as a consequence thereof, the output voltage of the control means 24 decreases and the reset spring of magnet 23 returns the valve into its normal position. Now water pump $P_1$ again receives water preheated in the heat exchanger 8, 14.

In order that water will always flow in the heat exchanger 8, 14 regardless of the positions of valve 22, this valve is advantageously made as a two-way flap valve so that in its normal position it closes a discharge outlet in pipe 14, but when actuated to its alternate position it opens the mentioned discharge outlet.

When desired, the control of the feeding of preheated and cold water can also be arranged to be continuous so that instead of magnet 23 a servo motor is used which, operated by the control means 24, adjusts valve 22 to such a position that the proportion of preheated water and cold will correspond to the desired temperature.

Because of the above mentioned temperature controlling system, the battery operates, according to the invention, always in stabilized conditions regardless of outside conditions, such as the temperature of the water to be fed into the electrolyte. In warm ambient conditions, the water fed into the electrolyte is not all or only to a small degree preheated whereas in cold ambient conditions, predominantly preheated water or preheated water only is fed into the electrolyte.

As the above battery is to be operated, valve 2 is opened and pressure medium from pressure chamber 3 drives the electrolyte from tank 1 to the battery 6, 9, effecting a voltage. Now the feed pumps $P_1$, $P_2$, and $P_3$ for the electrolyte components begin to operate in the way presented above, controlled by the corresponding control means 20 and 21 to feed water, chromic acid and sulphuric acid into the inlet pipe 5 for the forming of additional electrolyte. As the initial battery voltage is low, the acid pumps operate, as presented above, at high capacity so that excess acids are fed into the electrolyte. The electrolyte thus concentrated increases the battery voltage because of which the feeding rate of the acid pumps decreases, and if, for instance, the load of the battery ceases and the battery voltage thus considerably increases, the acid pumps will operate at their minimum output.

So the duration of the electrolyte and at the same time the operation cycle of the whole battery will be prolonged. Because of the optimal temperature conditions, and the effective flow, the electrolyte will be completely exhausted in passing through the battery and, due to the control system of the invention, the operation of the battery is effective and the voltage remains stabilized throughout the operating cycle which goes on until the electrolyte is exhausted or the soluble electrodes are consumed. Thus it has been rendered possible to generate by means of a battery according to the invention the same effect and energy per weight unit as by the best prior known silver-zinc accumulators, but the price of a battery according to the invention is only a fraction of the price of these prior known accumulators and in addition, as mentioned above, the voltage remains stabilized all the time.

The invention is not limited to the embodiment shown and described. Thus it may be advantageous to provide the battery with a device for heating the starting electrolyte so that from the very beginning of the operation the optimal operational conditions will be achieved. Naturally a device like this has to be operated by energy brought from the outside and it can be disconnected immediately after the starting.

It is also considered that besides the acid added to the feeding-pipe of the electrolyte, acid may also be added after the first section of the battery in order to stabilize the operational conditions as far as possible throughout the whole battery.

I claim:

1. Galvanic battery comprising: a plurality of cells, means for supplying water and at least one other electrolyte component from separate sources to form an electrolyte and for feeding said electrolyte through the cells of the battery, first regulating means responsive to the voltage of the battery for regulating the supply of said electrolyte components and thus the concentration of the electrolyte formed in a direction counteracting voltage variations, means for preheating the water to be supplied to the electrolyte, a first duct connecting said source of water directly to said water supply means, a second duct connecting said source of water via said preheating means to said water supply means, means responsive to the temperature of said formed electrolyte, and second regulating means in said ducts controlled by said temperature responsive means for regulating the proportion of water supplied through said ducts respectively in a direction counteracting deviations from a preselected temperature valve; said cells being arranged in two groups, an electrolyte duct connecting said groups to each other, said preheating means comprising a duct forming together with said electrolyte duct a heat exchanger having the electrolyte as heat delivering medium and water to be supplied to the electrolyte as heat receiving medium.

2. Galvanic battery as in claim 1 including a regulating valve in said water supply duct, said first duct and said second duct being connected to said valve, and said temperature responsive means controlling said valve and having a temperature feeling element placed in said electrolyte supply duct at a point thereof between said electrolyte component supply means and an inlet end of the battery.

References Cited

UNITED STATES PATENTS 2,921,111    1/1960    Crowley et al. _____ 136—162 XR
3,247,024    4/1966    Tamminen _____ 136—160 XR WINSTON A. DOUGLAS, Primary Examiner D. L. WALTON, Assistant Examiner U.S. Cl. X.R.

136—160, 161